(12) United States Patent
Buus et al.

(10) Patent No.: US 7,188,169 B2
(45) Date of Patent: Mar. 6, 2007

(54) SYSTEM AND METHOD FOR MONITORING KEY PERFORMANCE INDICATORS IN A BUSINESS

(75) Inventors: Bryan Buus, Broomfield, CO (US); Randall Gaz, Lafayette, CO (US); Tom Malaher, Calgary (CA); Michael Muller, Boulder, CO (US); Keith Schwartz, Chicago, IL (US)

(73) Assignee: Fair Isaac Corporation, Minneapolis, MN (US)

( * ) Notice: Subject to any disclaimer, the term of this patent is extended or adjusted under 35 U.S.C. 154(b) by 804 days.

(21) Appl. No.: 09/877,414

(22) Filed: Jun. 8, 2001

(65) Prior Publication Data

US 2003/0115315 A1 Jun. 19, 2003

(51) Int. Cl.
*G06F 15/173* (2006.01)
*G06F 15/16* (2006.01)
*G06Q 30/00* (2006.01)

(52) U.S. Cl. .................. 709/224; 709/223; 709/229; 709/250; 709/201; 709/202

(58) Field of Classification Search ................ 709/224, 709/223, 201–203, 229, 250; 705/35, 36, 705/7, 37, 8
See application file for complete search history.

(56) References Cited

U.S. PATENT DOCUMENTS

| | | | |
|---|---|---|---|
| 5,781,703 A | 7/1998 | Desai et al. | |
| 5,905,868 A | 5/1999 | Baghai et al. | |
| 5,995,943 A | 11/1999 | Bull et al. | |
| 6,041,362 A | 3/2000 | Mears et al. | |
| 6,055,493 A | 4/2000 | Ries et al. | |
| 6,108,686 A | 8/2000 | Williams, Jr. | |
| 6,119,103 A | 9/2000 | Basch et al. | |
| 6,148,335 A | 11/2000 | Haggard et al. | |
| 6,240,295 B1 | 5/2001 | Kennedy, III et al. | |
| 6,292,830 B1* | 9/2001 | Taylor et al. | 709/224 |
| 6,349,290 B1* | 2/2002 | Horowitz et al. | 705/35 |
| 6,360,249 B1* | 3/2002 | Courts et al. | 709/203 |
| 6,538,673 B1* | 3/2003 | Maslov | 715/853 |
| 2002/0038217 A1* | 3/2002 | Young | 705/1 |
| 2002/0099578 A1* | 7/2002 | Eicher et al. | 705/7 |

OTHER PUBLICATIONS

International Search Report for PCT Application Serial No. PCT/US02/18069, mailed on Oct. 29, 2002.

* cited by examiner

*Primary Examiner*—Jeffrey Pwu
(74) *Attorney, Agent, or Firm*—Michael A. Glenn; Glenn Patent Group

(57) ABSTRACT

A system for monitoring business performance indicators in a networked environment. The system comprises a data source having a predefined format, an agent communicatively coupled to the data source, wherein the agent is configured according to the data source format and wherein the agent is operative to gather data from the data source and translate the data into a first modified format thereby creating modified data. The systems also comprises a reaper communicatively coupled to the agent and configured to retrieve the modified data from the agent, a data repository communicatively coupled to the reaper and configured to store the modified data, an alert detector communicatively coupled to the data repository and configured to compare the modified data with a first configuration parameter, and a dashboard controller communicatively coupled to the data repository and configured to display the modified data in a format defined by a second configuration parameter.

46 Claims, 11 Drawing Sheets

Sample Dashboard - Association View

| Small Dash<br>Analysis Center<br>Logout<br>etc. | $240,833 ▲ 5% | 17483 ▲ 5% | 80% ▼ 5% |
|---|---|---|---|
| | Orders 6993  Sales per Order $34.44 | Repeat Rate 55%  Conversion 40.0% | As of 2:03 PM |
| $50,575,000 | 1  Abundant Rose Bouquet  $722,500 | 1  Abundant Rose Bouquet  $5,057,500 | Zip Codes  Successful Zip |
| | 2  Contemporary Rose Bouquet $505,750 | 2  Your Day Bouquet  $3,540,250 | Covered  Code Searches |
| | 3  Your Day Bouquet  $289,000 | 3  Blooming Masterpiece  $2,023,000 | Percent of Zip Codes with Owners 75% |
| Orders 1111005  Sales per Orde $45.52 | 4  Dried Heart Wreath  $216,750 | 4  Contemporary Rose Bouquet $1,517,250 | |
| 3750 | $64.22 ▲ 5% | 1.9 ▼ 5% | 80% ▲ 5% |
| | YTD Daily Average | YTD Daily Average  1.0 | YTD Daily Average |
| Percent of Enrolled Owning Zip Codes 50% | Zip Code Owner $75.23 Other Member $55.67 | Zip Code Owner 2.5 Other Member | Zip Code Owner 95% Other Member 65% |
| 3671325 | 7605 | 9878 | 1284964 |
| | Unique Visitors Today | Unique Visitors Today | Unique Visitors YTD |
| | Today YTD | Today YTD | |
| | Repeat Visitor Rate 65%  75% | Repeat Visitor Rate 75%  70% | MOE Visitor Value YTD  $44.31 |
| | Conversion Rate 90%  93% | Conversion Rate 1.5%  2.1% | Microsite Visitor Value YTD  $0.86 |
| Repeat Rate 65%  Conversion 30.3% | Sales per Order $56.09  $47.65 | Sales per Order $44.03  $41.12 | |

Figure 11

SYSTEM AND METHOD FOR MONITORING KEY PERFORMANCE INDICATORS IN A BUSINESS

FIELD OF THE INVENTION

The present invention pertains to systems and methods for measuring, quantifying, and monitoring business performance and operations, and more particularly, to systems and methods for analyzing key business metrics in a business environment and for providing a visual snapshot of the business metrics specified by a user.

BACKGROUND OF THE INVENTION

The availability and maintenance of an electronic business system is rapidly becoming the rule rather than the exception in order for a company to compete in today's marketplace. Interactive web-sites allow companies to reach a wide range of audiences and to actively promote and sell their products, services, or other offerings. However, with the integration of an interactive and dynamic web-site or other on-line business system comes the need to provide for continuous monitoring of the performance and utilization parameters of these automated business systems.

Systems for performing basic statistical analysis of raw business data are known and available in various forms. For instance, the analysis of traditional business performance indicators such as sales volume, profit margins, inventory levels, order placement, and revenue levels are readily calculated from a database compilation of the relevant information. Known systems are adapted to query a database that contains the raw data used to calculate these performance indicators and are adapted to provide the resulting information to a user in various formats. Similarly, known systems and products that merely provide data mining or data warehousing do not allow the flexibility to incorporate analysis systems from third parties or the ability to interrelate the corresponding business metrics with ongoing business operations.

In the context of an electronic commerce-based business environment, access to dynamic information such as system load time, web-site visits ("page hits"), registered users, page refresh rate, and product ordering demographics is also required in order to effectively monitor and evaluate the performance of a particular electronic business system or web-site. When provided to a user, this information is often needed in a dynamic form in order to accurately portray the business metrics associated with the data. However, traditional statistical analysis systems or database applications are not conducive to monitoring information that is constantly being updated or is by its very nature dynamic. Further, the analysis of electronic business metrics often involves complicated query structures and logic algorithms that are not easily replicated on a static system such as a relational database. Known third party applications that specialize in analyzing a particular type of information are often better suited and more efficient at analyzing and reporting this type of information but known systems are unable to effectively integrate these types of third party analysis tools into a monitoring system structured for a particular company.

Furthermore, known software applications and other systems fail to provide a user with a business metrics monitoring platform that allows real-time integration with strategic performance indicators while also being able to integrate existing legacy data systems and third party applications. Known systems also fail to provide usable information beyond generic statistics and cannot quantify the impact of specific business initiatives on an overall business objective.

SUMMARY OF THE INVENTION

In one aspect, a system for monitoring business performance indicators in a networked environment, comprises a data source having a predefined format, an agent communicatively coupled to the data source, wherein the agent is configured according to the data source format and wherein the agent is operative to gather data from the data source and translate the data into a first modified format thereby creating modified data. The system also comprises a reaper communicatively coupled to the agent and configured to retrieve the modified data from the agent, a data repository communicatively coupled to the reaper and configured to store the modified data an alert detector communicatively coupled to the data repository and configured to compare the modified data with a first configuration parameter, and a dashboard controller communicatively coupled to the data repository and configured to display the modified data in a format defined by a second configuration parameter.

In another aspect, a system for monitoring business performance indicators in a networked environment, comprises a data source having a predefined format, an agent communicatively coupled to the data source, wherein the agent is configured according to the data source format and wherein the agent is operative to gather data from the data source and translate the data into a first modified format thereby creating modified data. The system also comprises a reaper communicatively coupled to the agent and configured to retrieve the modified data from the agent, a repository manager communicatively coupled to the reaper, a data repository communicatively coupled to the repository manger, an alert detector communicatively coupled to the repository manager, and a dashboard controller communicatively coupled to the repository manager.

In another aspect, a method for monitoring a business metric in a networked environment, comprises coupling to a data source having a known format, wherein the data source includes data that represents the business metric, configuring an agent according to the data source format, gathering the data from the data source via the agent, translating the data into a first modified format, storing the modified data in a data repository, comparing the modified data with an alert parameter range, displaying the modified data in a format defined by a second configuration parameter, determining whether the modified data falls within the alert parameter range, and producing an alert if the modified data falls within the alert parameter range.

In yet another aspect, a system for monitoring a business metric in a networked environment, comprises a processor, a data storage device, and an instruction set residing on the data storage device, wherein the instruction set is configured to perform a method comprising coupling to a data source having a known format, wherein the data source includes data that represents the business metric, configuring an agent according to the data source format, gathering the data from the data source via the agent, translating the data into a first modified format, storing the modified data in a data repository, comparing the modified data with an alert parameter range, displaying the modified data in a format defined by a second configuration parameter, determining whether the modified data falls within the alert parameter range, and producing an alert if the modified data falls within the alert parameter range.

In a further aspect, a system for monitoring business performance indicators in a networked environment, comprises a collector adapted to communicatively coupled to a data source having a predetermined format, wherein the collector is configured according to the data source format and wherein the collector is operative to gather data from the data source and translate the data into a first modified format thereby creating modified data, a data manager communicatively coupled to the collector and configured to manage the input and output of the modified data between the collector and a data storage device, wherein the data manager is adapted to communicatively couple with an alert device, and a display interface communicatively coupled to the data manager and configured to display the modified data in a format defined by a second configuration parameter.

As will become apparent to those skilled in the art, numerous other embodiments and aspects of the invention will become evident hereinafter from the following descriptions and claims.

BRIEF DESCRIPTION OF THE DRAWINGS

The drawings illustrate both the design and utility of the preferred embodiments of the present invention, wherein:

FIGS. 11 and 12 are sample dashboards for an organization utilizing an association-franchise relationship.

DETAILED DESCRIPTION

Figure 1:
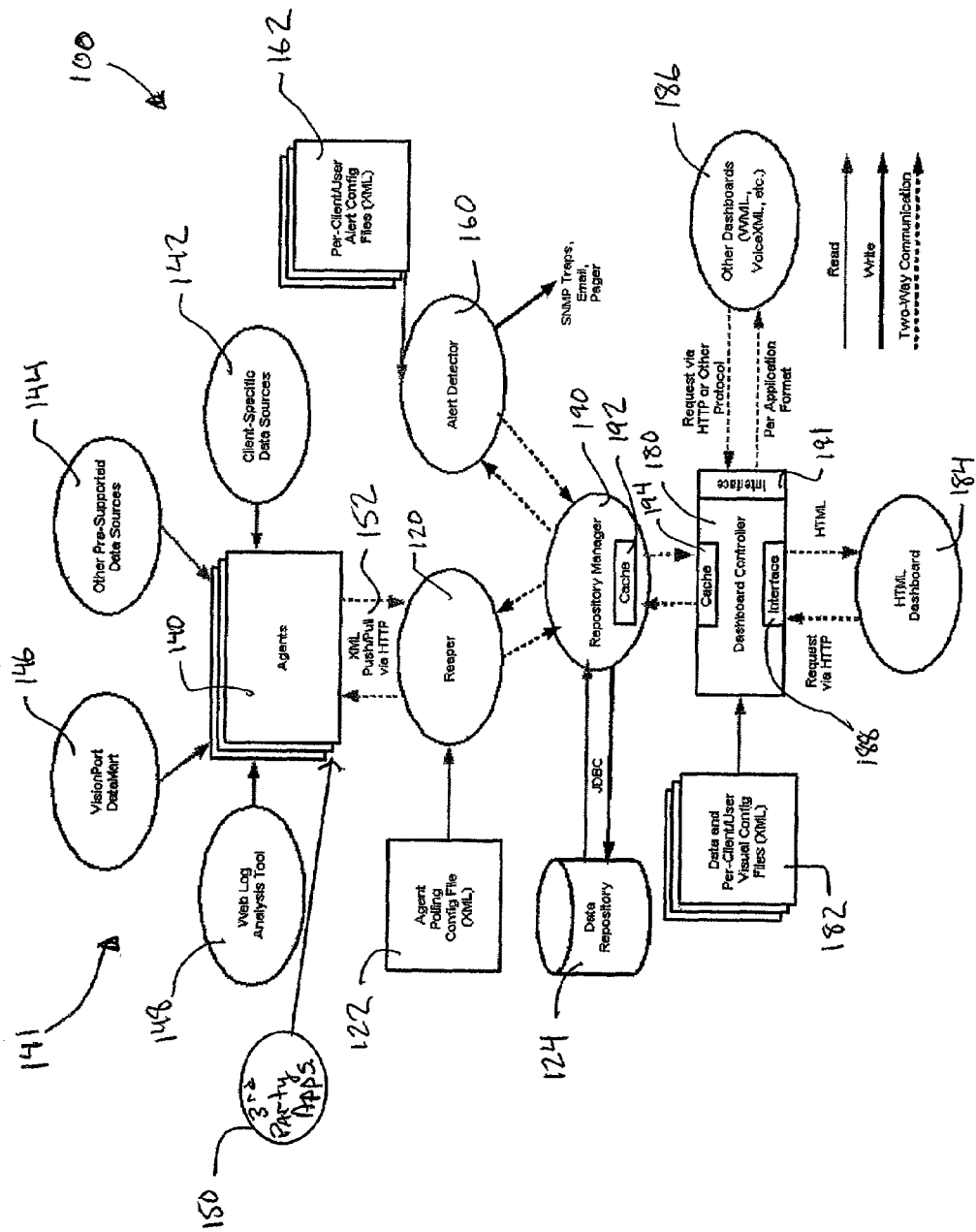
FIG. 1 is an architecture diagram of a dashboard system constructed in accordance with an embodiment of the present invention.

FIG. 1 shows a general architectural diagram of a dashboard system 100 constructed in accordance with an embodiment of the present invention. In a preferred embodiment, the dashboard system 100 is one module of an overall business monitoring and reporting system that is utilized to present a user with an overview of business metrics and other key performance indicators. The dashboard will sometimes be referred to herein as the VisionPort™ Dashboard System. VisionPort™ is a trademark of XOR, Inc.

Generally, the dashboard system 100 provides a high level executive view of key performance indicators for an eBusiness. The dashboard system 100 preferably presents a visually oriented snapshot of the status of key business metrics identified by a user. Preferably, the dashboard system 100 is an open and extensible framework of computer software or fixed hardware components designed to enable organizations to build real-time measurement and monitoring solutions for applications and systems. The dashboard can be installed at a user's own facility or maintained at an off-site Application Services Provider for a particular client. Additionally, the various components of the dashboard system 100 maybe spread across different platforms or physical locations.

The dashboard system 100 is preferably configurable on a per-user or per-client basis, customizable to show each user or client exactly what information they want access to. For instance, a marketing group can be shown one set of information such as sales and advertising revenues while a company officer can be shown a broader scope of inflation about the performance of the company. In addition to being able to gather information from legacy or other existing proprietary company information, the dashboard system 100 is adapted to either link to or direct a user to an appropriate $3^{rd}$ party application tool to get the required information. The dashboard system 100 is preferably viewable through readily available internet browser software, such as current versions of Internet Explorer® or Netscape Navigator®. Other devices such as WAP-compatible phones, Palm OS based devices, Blackberry, VoiceXML, and email programs are also preferably compatible with the information provided by the dashboard system 100 so that a user can access the information from a variety of interface devices. In that respect, the framework of the dashboard system 100 is preferably extensible in order to support a wide range of application interfaces.

The diagram depicted in FIG. 1 provides an overview of the technical architecture of a preferred dashboard system framework and its system requirements. The dashboard system 100 includes four primary components, a reaper 120, one or more agents 140, an alert detector 160, and a dashboard controller 180. While each of these four primary components will be described in more detail below, the following is an overview of their function and structure. Briefly, the agents 140 are used to gather information from various data sources, third party applications, data servers, legacy systems, etc., and reformat the data into a common scheme using XML. The reaper 120 is adapted to contact the agents in order to gather the reformatted data and store the reformatted data in a data repository (reference number 124 in FIG. 1). The reaper 120 is also preferably adapted to perform data aggregation and history creation. A repository manager 190 is also shown in FIG. 1 that further manages the inflow and outflow of data to and from the data repository 124.

The alert detector 160 reads the data from the repository and compares the information to an alert configuration parameter. If an alert is detected, the alert detector initiates an appropriate action such as an SNMP trigger, paging, email, or visual alert. The dashboard controller 180 acts as the interface between an end-user and the information in the data repository. The dashboard controller requests information from the data repository 124 and converts the requested information into a format compatible with the user's selected interface. The dashboard controller 180 is also adapted to read a configuration file in order to determine which information should be delivered to the user interface.

With continuing reference to FIG. 1, the architecture of the dashboard system 100 is described in more detail. Data is retrieved via the agents 140 from a number of different data sources 141. The data sources 141 can be presented in any number of different formats, including, without limitation, a client-specific data source 142, a pre-supported data source 144, a datamart 146, a web log analysis tool 148, and a third party application 150. A plurality of agents 140 are utilized, one for each of the data sources being incorporated into the dashboard system 100. Each of the agents 140 are specifically formatted to interact with its associated data source. In a preferred embodiment, the agents are computer software programs written specifically for each of the respective data sources.

The reaper 120 communicates with each of the agents 140 by a two way communication link 152 and is adapted to pull the data gathered by the agents on a scheduled basis. The reaper is adapted to utilize, for example, an XML push/pull routine in order to access and retrieve the data from the reaper 120. An agent polling configuration file 122 defines the necessary polling schedule information for the reaper 120. A datastore or data repository 124 serves as a data cache and stores the information gathered by the reaper 120. A repository manager 190, includes one or more memory caches 192, and further monitors and directs data that is transferred between the dashboard controller 180, the data repository 124, the reaper 120, and the alert detector 160.

An alert detector 160 is in two-way communication with the repository manager 190. The alert detector traps threshold conditions that are defined in an alert configuration file 162 and compares the threshold conditions to the data stored in the data repository 124 and processed by the repository manager 190. The alert detector 160 also sends notifications or alarms to a user based on definitions set in the alert configuration file 162. Notifications and alarms can be in the form of an SNMP trap, email notification, pager notification, visual notification, or any other type of data transfer alert. For instance, if a data value stored in the data repository 124 is outside of a range defined in the alert configuration file, the alert detector will send an alarm or notification to the user indicating the "out of range" condition. As an example, if the dashboard system 100 is monitoring web-site hits per hour and the user wants to know if this value rises above a number that corresponds to the maximum capacity of the web server, the alert detector will recognize this condition and send an alert to the user.

The dashboard controller 180 is communicatively coupled to the repository manager 190 and generally functions to format the visualization of the data gathered by the agents 140 and passed through the reaper 120. A unique per-user configuration file 182 is customized for each user of the dashboard system 100 and defines for each user what information from the dashboard system 100 should be displayed to the user on a display device. The display device can be either a conventional PC monitor, a cell phone display, a PDA display (such as a device operating under the PALM or Windows CE operation systems), a pager display, or any other type of data display device. Additionally, information may be translated into a VoiceXML so that information may be accessed on a voice based system.

The dashboard controller 180 includes an HTML interface 188 that visually formats the data for display on a conventional web browser in the form of an HTML dashboard 184. The dashboard controller 180 also includes another interface 191 that formats the data for display on another type of dashboard such as one adapted to display or otherwise communicate WML, VoiceXML, or another data protocol. In this sense, it is contemplated that the dashboard controller 180 may include any number of interfaces. The dashboard controller 180 is preferably adapted to be expandable to incorporate interfaces for future types of dashboard viewing tools. Each of the components of the dashboard system architecture depicted in FIG. 1 are preferably implemented in computer software residing on some form of fixed or otherwise permanent storage system such as a data server or other network of computers. However, the dashboard system 100 may also be implemented in a fixed hardware format such as an Application Specific Integrated Circuit (ASIC) or a Field Programmable Gate Array (FPGA).

Figure 2:
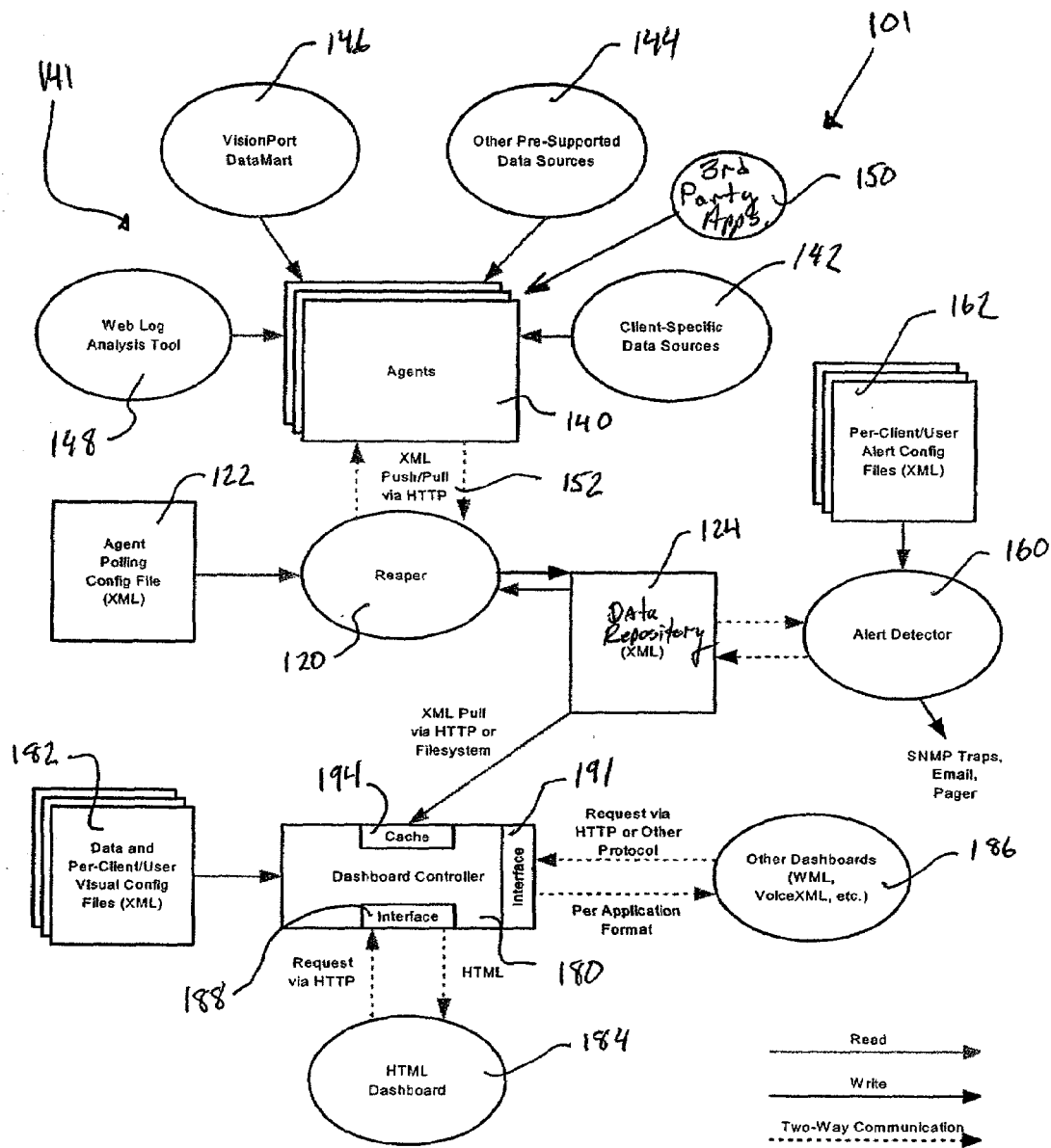
FIG. 2 is an architecture diagram of a dashboard system constructed in accordance with another embodiment of the present invention.

FIG. 2 is another embodiment of a dashboard system 101 constructed in accordance with the present invention. The dashboard system 101 is similar in structure and function to the dashboard system 100 previously described except that a repository manager is not utilized. Instead, the reaper 120 is directly coupled to the data repository 124 which is in turn coupled to the dashboard controller 180.

Agent

Referring again to FIG. 1, the dashboard system 100 collects data through its respective agents 140. Preferably, an agent is a program that fetches a set of information, formats the information into XML, or some other form of open coding language for storage in the data repository 124. Agents can be created using programming libraries developed from software languages such as PERL and JAVA as well as other programming languages. Each agent 140 can return one or more data items can be designated to return information in one of two ways. First, each of the agents 140 can return information dynamically. In the the reaper 120 contacts the agent program via a Hyper Text Transfer Protocol (HTTP). The agent 140 then dynamically gathers the information and delivers XML to the reaper 120. Second, the agent can return information statically. In this manner, the agent is run at a time when the data is known to have changed, such as when a nightly processing routine is completed. The agent 140 then writes its XML out to a static file. The reaper 120 is further configured to access this static XML file. Agents can be formatted to get their associated data through a variety of means including SQL queries, text file processing, HTML scraping via an HTTP call, incoming email processing, SNMP, or spreadsheet exports. Other data gathering means are contemplated by the present invention and the above list is not meant to be limiting. Appendix A, which is hereby incorporated by reference, contains a listing of exemplary agents that have been developed for use in accordance with a dashboard system constructed in accordance with an embodiment of the present invention. Appendix A also includes selected information from future agents that are contemplated by a dashboard system constructed in accordance with an embodiment of the present invention.

When an agent generates its data, it preferably converts that data into XML or another open code environment. The XML format is used for communication between the reaper 120 and the agents 140, and from the repository manager 190 to the dashboard controller 180.

As a typical example, dashboard XML files are structured in the following manner:

```
<?xml version="1.0" standalone="no"?>
<!DOCTYPE dashboard SYSTEM
"http://www.xor.com/xml/dtds/dashboard.dtd">
<dashboard>
    . . .individual data items. . .
</dashboard>
```

Dashboard Data Types—Generally, each piece of data assembled by the dashboard must conform to a data type. "Is a" notation is preferably used to declare inheritance between the different data types. When one data type "is a", it inherits the required and optional attributes from the given data type. The list compiled in Appendix B, which is hereby incorporated by reference, contains examples of data types supported by a dashboard system constructed in accordance with an embodiment of the present invention.

It is noted that the information in Appendices A and B only represents examples of agents and dashboard data types created for specific applications. It is contemplated that agents and data types may be created for any type of existing data or third party data processing application. Customized libraries can be established for use in creating agents. For example, PERL libraries may be established to supply methods for creating new dashboard objects, "freezing objects into XML", "thawing" objects into objects, and "selecting" a data item from within an XML structure. An example PERL library is included at Appendix C which is hereby incorporated by reference.

In addition to the agents described in Appendix A, the following are additional agent descriptions that may be created for a dashboard system constructed in accordance with an embodiment of the present invention. For example, the agents can be adapted to have the ability to "push" data to the reaper, rather than the data being polled. This may be accomplished by having the reaper supply an agent with a "callback" URL. The agent can then hit the callback URL to supply data to the reaper. An optional sequence/version number may be added to the dashboard XML item. Agents that write static HTML files would update the version number each time they write the file. Then, the reaper can use the version number to determine if the dataset has changed. Agents can also be adapted to have the ability to accept arguments from the reaper. For example, a generic "SQL Agent" could be created that accepts a SQL statement from the reaper and returns the results.

Reaper

The reaper gathers XML data by contacting the agents. The agents are contacted based on information supplied through a reaper configuration file (agent polling configuration file 122 from FIG. 1). Preferably, the reaper configuration file supplies agent information for all agents, across all clients or there may exist multiple reaper configuration files; one for each client. The following represents a preferred example of a reaper configuration file:

| Reaper Configuration File | |
|---|---|
| Description | Indicates an individual agent that should be contacted to gather information. |
| Notes | The name of each agent in the top level, or in a group (see below) must be unique. If an object disappears from the XML tree returned by an agent, it should be removed from the repository. |
| Attributes | |
| Name | The name of the XML file that the XML tree returned by this agent will be stored in. |
| source_url | The URL of the agent that supplies the XML data. |

| Reaper Configuration File | |
|---|---|
| Enabled | Indicates whether this agent is currently being refreshed (used). Valid values are true and false. Default: true |
| Path | The name of the directory that the XML file will be stored in. If not specified, will inherit from its group (in which case it must be set in the group; see below). |
| Refresh | The refresh frequency in seconds or a cron-style entry (see man 5 crontab). If not specified, will inherit from its group (in which case it must be set in the group; see below). |
| rate_type | Indicates that the reaper should automatically generate a rate field for this agent. The rate is calculated after new data is stored and the history is updated. If not specified, will inherit from its group (if set in the group). Valid values are none, difference: number, percent: number, persecond: number, median: number, averagechange: number, and averagevalue: number. Default: none. |
| Precision | Specifies a precision to limit all number elements to. A precision of "1" will make numbers look like "2.5". Default: leaves numbers as-is. |
| History | Indicates that the reaper should accumulate history for items within the XML tree returned by the agent. The history value specifies how many historical values should be kept. Default: 0 |

The different rate_types that may be requested in the above configuration file example are further defined as follows:

| | |
|---|---|
| none | Do not populate the rate field. |
| difference: number | Rate is calculated as: (current_value − history[number]). For example, difference: 1 calculates the difference between the current and previous values. If number is greater than the size of the history, then the oldest item in the history will be used instead. |
| percentage: number | The rate_type is calculated in the same manner as difference, but a percentage change is placed in the rate field instead of the difference. |
| median: number | Rate is calculated as: (current_value + history[number])/2. For example, median: 5 calculates the median between the current and 6th history value. |
| persecond: number | Rate is calculated as: (current_value − history[number])/ (current_timestamp − timestamp[number]). For example, persecond: 1 calculates the difference between the current and previous in units per second. |
| average: number | Calculates the average of the history items, from current to history[number]. |
| Averagechange: number | Calculates the average change, from current to history[number]. |

History Details—When scanning an XML tree returned by an agent, each element of type number (or subclass thereof) will have history accumulated for it by reading the previous list of values (if any) from the repository and adding the new value to the end of the list. Text and HTML objects will have their history stored by separating chunks of information by a null character. Other object types will simply have the latest value stored in the repository.

An element will not be pushed onto the history if its current timestamp is the same as the most recent item in the history list. This would occur when the agent program is setting the timestamp explicitly. For example, an agent may choose to set the timestamp to the time that the agent knows the data was last updated (with web logs, that is likely the timestamp of the previous day). If an agent provides its own history, then that history should be used instead, and not be overwritten.

An element of history length of X actually stores X+1 elements in its history. The "zero" element in the history array is the same as the current value/timestamp. Elements 1 to X+1 are the historical values/timestamps.

The following is an example of an Agent XML description:

```
<agent name="poll" refresh="20" path="/vitamins"rate_type="difference:0"
    source_url="http://www.vitamins.com/cgi-bin/dashboard/agents/poll"/>
<agent name="feedback" refresh="120" path="/vitamins" enabled='false'history='100'
    source url="http://www.vitamins.com/cgi-bin/dashboard/agents/feedback"/>
```

Agents may be classified and categorized by groups. Each group preferably has the following characteristics associated with it.

| | |
|---|---|
| Description | Specifies a group of related agents. Optionally specifies that the reaper should aggregate multiple items together into a single item. |
| Notes | The name of each group must be unique. |
| Attributes | |
| name | A unique name that can be used to refer to this group. Also used as the XML file name where the aggregated numbers will be stored if aggregation is enabled. |
| enabled | Indicates whether this group is currently being refreshed (used). Valid values are true and false. If false, then none of the agents in the group will be refreshed, independent of the settings of their individual flags. If true, then each agent can specify its own enabled status. Default: true |
| path | The directory location in which to store the resulting aggregated numbers, if aggregation is enabled (see below). If a path is defined here, it will be used as a default for agents in the group that don't have a path defined. |
| refresh | The refresh frequency in seconds or a cron-style entry (see man 5 crontab). If specified, it will be used as a default for agents in the group that don't have a refresh defined. |
| precision | Specifies a default precision to limit all number elements to in the group. A precision of "1" will make numbers look like "2.5". Default: leaves numbers as-is. |
| rate_type | Indicates that the reaper should automatically generate a rate field for the agents in this group. If specified, it will be used as a default for agents in the group that don't have a rate_type defined, and for aggregation, if it is enabled (see below). Default: none. |
| history | Indicates that the reaper should accumulate history for the aggregated items (see below), and how many historical values should be kept. If specified, it will also be used as a default for agents in the group that don't have a history defined. Default: 0 |
| Aggregate Numeric | Indicates that numeric aggregation should be performed on the values within this group. Valid values are none, sum, average, and overlay. Default: none |
| Aggregate Other | Indicates that aggregation of other, non-numeric data types should be performed on all the values within this group. Valid values are none, merge, and overlay. Default: none |
| Aggregate Maxoffset | Indicates the allowable time offset in seconds to use when aggregating history items. Default: infinite |
| Aggregate Rate_type | Indicates that a rate of change should be calculated for the aggregated values. See the "rates" section below for possible values. Default: none |

Aggregation—When aggregation is enabled in a group, all of the child trees listed in the group will be scanned and a new tree will be constructed that contains elements from both trees. Corresponding elements in the tree (same name and location in the XML tree) are aggregated according to the following rules:

aggregate_numeric=sum|average
    Items and their subtypes will be numerically summed/averaged. The latest value of each item will enter into the calculation of the aggregate value, regardless of its timestamp. History items will be summed/averaged if their timestamps fall within a given number of seconds of each other. If they do not, then the latest of the timestamped values is used.

aggregate_numeric=overlay
    Overlays the new information on top of the old. For example, old_xml.overlay(new_xml) would overlay the contents of old_xml with the contents of new_xml. Any elements that are in new_xml that are not in old_xml will also be kept. Anything in the intersection of the two is defaulted to new_xml.

aggregate_numeric=none
    No numeric aggregation is performed.

aggregate_other=overlay
    Works the same as aggregate_numeric overlay, but with non-numeric items.

aggregate_other=merge
    Appends as best possible non-numeric items. See specific data types below for definition.

aggregate_other=none
    No non-numeric aggregation is performed.

Details for specific data-types—gauge items behave similarly to number items, with the added feature that the minimum value will be the greatest value of all the minimums of the items being aggregated, but it will be suppressed if not specified for any of the items. Likewise for the maximum (maximum value of all maximum values; suppressed if not specified for any item). "Text" items should have their contents concatenated, separated by newlines, in the order listed in the reaper configuration file. HTML items should have their contents concatenated, separated by an <HR>, in the order listed in the reaper configuration file. "Image" items should not be aggregated, and will generate an error if any are present in the XML trees specified within the group. "Chart" items should be aggregated as follows. The labels should be the union of all label values. The datasets should be the union of all datasets. Elements of datasets with identical names should have the corresponding values of the datasets numerically summed/averaged/overlayed.

For the purposes of averaging, the actual number of items summed will be used to calculate the average. In other words, if there are 5 agents in the group, but one agent does not return a particular value, then the remaining 4 values will be summed and divided by 4 to calculate the average. If the agent wishes a "zero" value to be included in the average, it should return an item with an explicit value of 0.

An error will occur if items to be aggregated do not have exactly the same type (e.g. it will be an error to try to aggregate text and image or number and gauge). The individual XML trees retrieved from each agent will be stored as in the repository, so that a UI can retrieve the individual values as well as the aggregate. The historical values will be merged into a single list. Corresponding history items will be summed/averaged/overlayed (e.g.: sum=history_1[0]+ history_2[0]). The reaper will do some level of error checking, as defined by aggregate_maxtimeoffset, to make sure that the timestamps are not different by more than this value. If they are, the history item with the newer timestamp is used, and a warning is logged.

The following is an example of a Group XML example:

```
<group name='stuff' enabled='false'>
    <agent name="poll" refresh="20" path="/vitamins"
        source_url="http://www.vitamins.com/cgi-bin/agents/poll"/>
    <agent name="feedback" refresh="20" path="/vitamins" enabled='false'
        source_url="http://www.vitamins.com/cgi-bin/agents/feedback"/>
</group>
<group name='all_web' path='/vitamins/web' aggregate_numeric='sum'
        aggregate_other='none' aggregate_rate_type='sum' aggregate_maxoffset='60'>
    <agent name="www1" refresh="60" path="/vitamins/web"
        source_url="http://www1.vitamins.com/cgi-bin/agents/web"/>
    <agent name="www2" refresh="60" path="/vitamins/web"
        source_url="http://www2.vitamins.com/dashboard/web"/>
</group>
```

This above example generates the following XML repository files:

/vitamins/web/www1.xml: the raw values from www1.vitamins.com

/vitamins/web/www2.xml: the raw values from www2.vitamins.com

/vitamins/web/all_web.xml: the aggregated values from both servers

When creating an aggregate object, the aggregate itself should be locked before it starts to process its group's items. This fixes possible deadlocking and agent data changing in the middle of an aggregation.

The following additional features of a dashboard reaper constructed in accordance with an embodiment of the present invention are also contemplated. To support an agent "push" enhancement, the reaper may supply the agent with a "callback" URL. The agent can then hit the callback URL to supply data to the reaper. To support an agent "version" enhancement, the reaper may be adapted to recognize the version number to determine if the dataset has changed. To support an agent "argument" enhancement, the reaper may be adapted to support attribute(s) to send arguments to an agent that is designed to be "generic." Exceptions may be indicated if the reaper is not able to contact an "enabled" agent. For example, an email may be sent to an administrator.

The reaper may also be adapted so that the reaper children that are performing a request can "time out." This timeout value would default to something reasonable (i.e. 60 seconds) and may be overwritten by an agent/group specific "timeout" attribute. The controller can be adapted to make a dynamic request for information. If the reaper does not have the request in the datastore, the reaper would then contact the appropriate agent for the information.

A configuration file for each client may be set up and a configuration file for "generic" information (e.g.: News, Stock Market Quotes) may also be set up. The reaper should be able to be told to re-read a specified configuration file.

Alert Detector

An "alert" can be set on any Dashboard indicator and is triggered when an indicator does, for example, one of the following: 1) descends below a certain threshold; 2) rises above a certain threshold; or 3) is on or between two numbers. When an alert is defined, a severity and an action are associated with it. For example, severity levels of zero through three can be defined (this can be expanded upwards if needed). Actions that can be taken include: 1) Visual: An element in the indicator changes, such as an arrow turning red; 2) Email: An email is sent to a specified address. This address could be a normal user's address, a list of users or a pager email address (most alpha-numeric pagers have associated email addresses); 3) SNMP: An SNMP "trap" can be triggered. SNMP stands for "Simple Network Management Protocol" and is used by network monitoring software to gather information and alerts about routers, switches, machines and other network-enabled devices. For example, SNMP could be used to alert a user's monitoring software. In order for the controller to know if an alert has been triggered, the Alert Detector writes out an XML file that contains the appropriate alert information.

Preferably, an alert configuration file supplies alert information for all agents, across all clients or there may exist an alert configuration file for each user or client. The following describes the contents of the configuration file that are wrapped with an alerts XML tag.

| Action | |
|---|---|
| Description | Indicates an action to take when an alarm is triggered. |
| Notes | The name of each action must be unique. |
| Attributes | |
| name | The name of the action. This is used in the monitor tags to indicate which action to take when an alert is triggered. |
| Type | The type of action to take. Can be one of: display: Indicate that an alert has happened on the dashboard display email: Email a notification to someone that an alert has occurred snmp: Trigger an SNMP trap |
| destination | The contents of the destination depends on the action type. display: The alert file to write its alert XML to. email: Email address(es) of the people to notify. Note that this can also be a pager email address snmp: MIB |
| color | Only set for actions of type "display". The color is made available to the templating engine. |
| template | Only valid for actions of type "email". Email template to use to compose the email. |
| subject | Only set for actions of type "email". The subject of the email being sent. |

-continued

| Action | |
|---|---|
| Once | Only set for actions of type "email". Indicates if an alert should be sent only once (set to "yes"), or every time that the alert detector uses this action type. |
| snmp | Only set for actions of type "snmp". The MIB address to send the alert to. |
| XML | `<action name="EmailAdmin" type="email"`<br>`    template="emailbody"`<br>`    destination="admin@xor.com"`<br>`    subject="Alert"`<br>`    once="yes" />`<br>`<action name="Down" type="display"`<br>`    color="#ff0000"`<br>`    destination="ALERTS" />`<br>`<action name="Neutral" type="display"`<br>`    destination="ALERTS"`<br>`    color="#77ccff" />`<br>`<action name="Up" type="display"`<br>`    destination="ALERTS"`<br>`    color="#66ffcc" />` |

| Monitor | |
|---|---|
| Description | Surrounds a block of level tags and specifies the XML to look at to detect an alert. |
| Notes | The name of each monitor must be unique. |
| Attributes | |
| name | The name of the monitor. |
| Source | The name of the source XML file or an alias to the source XML file (specified in data.xml). |
| select | A selection of a data item inside the source. Only required if the source doesn't point to the item to look at. |
| XML | `<monitor name="DJIA" source="DJIA"`<br>`    select="difference/value">`<br>`    . . .`<br>`</monitor>` |

| Level | |
|---|---|
| Description | Defines the actual alert ceiling/floors for this monitor. A level may only be specified inside a monitor. |
| Notes | The name of each level within its monitor must be unique. |
| Attributes | |
| name | The name of the action. This is used in the monitor tags to indicate which action to take when an alert is triggered. |
| Eff_type | Effective start date, specific as YYYYMMDD. If one is not specified, it will begin immediately. |
| Low | If both a low and high are set, the low specifies the floor for this alert. If an alert falls on or between the low and high (inclusive), this alert is triggered.<br>If only a low is set, then an alert is triggered if the value falls on or below the low. |
| High | If both a low and high are set, the high specifies the ceiling for this alert. If an alert falls on or between the low and high (inclusive), this alert is triggered.<br>If only a high is set, then an alert is triggered if the value falls on or above the high. |
| XML | `<level name="down" eff_date="20010101" low="-25"`<br>`    high="0">`<br>`    . . .`<br>`</level>` |

| Result | |
|---|---|
| Description | Defines tags to set in the template engine for this level. A result can only be specified inside a level. |
| Attributes | |
| directional | Tag used in the templating engine to indicate part of the name of a directional graphic to display. |
| Msg | Message to display to the end-user when they place their mouse over the alert icon. |
| Severity | The severity level for this alert. Ranges can be 0 through 3. 0 is typically a visual-only alert (change a directional graphic red, for example), while alerts 1 through 3 typically indicate a more severe problem. An alert icon is displayed to the user for severity levels 1 through 3. |
| XML | `<level name="down" eff_date="20010101" low="-25"`<br>`    high="0">`<br>`    <result directional="red" msg="Falling" notes=""`<br>`        severity="0"/>`<br>`</level>` |

| Log | |
|---|---|
| Description | Defines the action that this alert uses. |
| Attributes | |
| action | Indicates the action name to trigger for this alert. |
| destination | Destination XML file; overwrites the destination specified in the action. |
| XML | `<level name="down" eff_date="20010101" low="-25"`<br>`    high="0">`<br>`    <log action="Down" destination="DJIAalert"/>`<br>`</level>` |

The following is an example of an XML scheme for a component that represents a DJIA stock market index alert.

```
<alerts>
  <action name="Down" type="display"
          color="#ff0000"
          destination="ALERTS"/>
  <monitor name="DJIA" source="DJIA" select="difference/value">
      <level name="down" eff_date="20010101" low="-25"
             high="0">
          <result directional="red" msg="Falling" notes=""
                 severity="0"/>
          <log action="Down" destination="DJIAalert"/>
      </level>
      <level name="down25" eff_date="20010101" low="-50"
             high="-25">
          <result directional="red" msg="Down over 25"
                 notes=""
                 severity="1"/>
          <log action="Down" destination="DJIAalert"/>
      </level>
      <level name="down50" eff_date="20010101" low="-75"
             high="-50">
          <result directional="red" msg="Down over 50"
                 notes=""
                 severity="2"/>
          <log action="Down" destination="DJIAalert"/>
      </level>
      <level name="down75" eff_date="20010101" low="-75">
          <result directional="red" msg="Down over 75"
                 notes=""
                 severity="3"/>
          <log action="Down" destination="DJIAalert"/>
      </level>
  </monitor>
</alerts>
```

The above XML alert is set up to behave in the following manner. If the change in the index since the market opened is positive, no alert is set. If the change in the index since the market opened is between 0 and −25, alert severity 0 is triggered, and the down-arrow is made red. If the change in the index since the market opened is between −25 and −50, alert severity 1 is set, the down-arrow is made red and an "Alert Severity 1" icon is displayed on the indicator. If the user places their mouse over the indicator they will see the text "Down over 25". Alert severity 2 is set when the change in the index since the market opened is between −50 and −75. The down-arrow is made red and an "Alert Severity 2" icon is displayed on the indicator. If the user places their mouse over the indicator they will see the text "Down over 50". If the change in the index since the market opened is over −75, alert severity 3 is set, the down-arrow is made red, and an "Alert Severity 3" icon is displayed on the indicator. If the user places their mouse over the indicator they will see the text "Down over 75".

It is also contemplated that in a dashboard system constructed in accordance with an embodiment of the present invention, the alert detector may have the following additional features. Users can have the ability to specify Key Performance Indicators. The controller gets its information from a user/client-specific output file and there are user/client-specific alarm configuration files. A single alarm file may "include" another. Duplicate alarms would be overwritten by the alarms in the included file. Alarms may activate/deactivate based on a start and end date and time (i.e.: today the ceiling is 10, tomorrow the ceiling is 20). Alarms may be dynamically set by requesting ceiling/floor information from another data source. A user interface may be created for changing alarm information and alerts may be set that span different agents.

Dashboard Controller

The dashboard controller configuration is composed of a large set of files that can be configured per user. These include HTML/ASCII templates, data location definitions, and the display configuration. The basic configuration is composed of the following directory hierarchy:

```
dashboard
|
+-conf
| |
| +-full Default configuration directory; contains a configuration file for
each user
|
+-templates
  |
  +-default
  | |
  | +-framed
  | +-htmltable
  | +-<other types of rendering templates>
  |
  +-<username> Optional; this is only used if the user/client needs a
    custom
template
      |
      +-framed
      +-htmltable
      +-<other types of rendering templates>
```

The conf directory contains the XML files that define the screen display. Each user has one configuration file preferably named username.xml. In addition, there is a file that defines aliases that reference the dashboard data repositories. It is preferably called data.xml, but may be changed so that the filename is specified in the username.xml file.

The templates directory contains a default directory, and may contain a directory hierarchy for each user. The default directory is used if a template file can't be found in the user directories. These directories contain templates, ending in .tmpl, specific for the display renderers. Each type of renderer contains a set of templates that correspond to either the type of dashboard object or a template type specified in the user configuration. The templates are processed to replace a set of tags with the data values from the data sources. There are five tags that are used to do this:

<TMPL_VAR NAME="name">
  This is a basic "name" substitution. If a data element specified by name exists in the user configuration file, then that value will be inserted into the output.

<TMPL_IF NAME="name"> . . . </TMPL_IF>
  This is a conditional statement. The text between the beginning and ending TMPL_IF tags will be included in the output if the value of name evaluates to true in the Perl sense: either non zero or a string. This tag also has a <TMPL_ELSE> tag that can be used for if-then-else scenarios.

<TMPL_UNLESS NAME="name"> . . . </TMPL_UNLESS>
  This is the reverse of the TMPL_IF tag. It outputs its text if the value of name evaluates to false in the Perl sense: 0 or undefined.

<TMPL_LOOP NAME="name"> . . . </TMPL_LOOP>
  This is the basic looping mechanism. The TMPL_VAR and TMPL_IF tags can be contained within the loop. The loop is ran until it has iterated over all of the data values contained in the name (as specified in the user configuration file).

<TMPL_INCLUDE NAME="filename.tmpl">
  Includes the named file in this template. Works just like a server-side include.

The following is a preferred example of a template:

```
<TABLE>
<TR>
<TD>name = <TMPL_VAR NAME="name"></TD>
<TD>Description = <TMPL_VAR NAME="description"></TD>
</TR>
<TMPL_LOOP NAME="load">
<TR>
<TD>
<TMPL_IF NAME="machine_name">
<TMPL_VAR NAME="machine_name">
</TMPL_IF>
</TD>
<TD>
<TMPL_IF NAME="machine_load">
<TMPL_VAR NAME="machine_load">
</TMPL_IF>
</TD>
</TR>
</TMPL_LOOP>
</TABLE>
```

The following is a preferred example of an output file:

```
<TABLE><TR>
<TD>name = Load Times</TD>
<TD>Description = Load Times on Client Machines</TD>
</TR>
<TR>
<TD>
Machine 1:
</TD>
<TD>
1.5
</TD>
</TR>
</TR>
<TR>
<TD>
Machine 2:
</TD>
<TD>
3.2
</TD>
</TR>
</TABLE>
```

Data configuration files contain XML entities that define aliases (shortcuts) to the Dashboard data repository items. These aliases are used in the controller configuration files. The default data file is preferably located in a file labeled /info/dashboard/ conf/full/data.xml, but there may be one file per client/user (named the client/user). The aliases add an abstraction layer that may be able to be used to reduce the overall number of templates that are needed.

The following is a preferred example of a data configuration file:

| Load | |
|---|---|
| Description | Associates an alias name to a data file |
| Notes | At a minimum, a load should be created for each XML data file that will be accessed in the user's display configuration. |
| Attributes | |
| Name | The name of the alias. The name of each load should be unique. |
| File | The full filename of the repository data file. In a future release, this should be changed to be relative to the base directory of the dashboard repository. |
| select | A path into the specified file's XML data tree. This attribute allows an alias to point to a data node that is deep within the XML tree. If a select is not specified, then the alias simply points to the data file. |
| XML | `<load name="servicemetrics" file="/info/dashboard/repository/servicemetrics/sm.xml"/>` `<load name="historical_stats" file="/info/dashboard/repository/tsn/weblog/historical.xml" select="sitestats"/>` `<load name="weblog" file="/info/dashboard/repository/tsn/weblog/weblog.xml"/>` `<load name="weblog_box1" file="/info/dashboard/repository/tsn/weblog/box1.xml" select="sitestats/www.sportingnews.com/today"/>` |

Each display configuration file defines the display of a specific user or client. They work with the aliases defined in the data configuration. The configuration file contains the following hierarchy of elements which are described in more detail in Appendix D, which is hereby incorporated by reference:

```
- navorg
  - section
    - construct
      - item
```

All of the tags can contain one or more attr elements, which behave similar to an entity/attribute that is included within the main element tag. This is primarily used for readability, when an item has a lot of attributes. For example, a layout attribute can be specified with either:

```
<section position="1">...</section>
(or)
<section>
  <attr name="position">1</attr>
  ...
</section>
```

There are a number of variables that are automatically populated for templates. Whether or not a variable is populated depends on the data elements that a template is given and the item types being displayed. A list of variables are found in Appendix E, which is hereby incorporated by reference.

The templates used by the dashboard controller are accessed by using template="templatename" in a construct. A number of templates have already been developed and are listed in Appendix F, which is hereby incorporated by reference. These have been developed to provide a high level of flexibility across many different types of metric measurements.

A dashboard controller utilized in a dashboard system constructed in accordance with an embodiment of the present invention may also be adapted to include the following features. Object caching may be added in order to speed up the display. "Include" files may be added inside the Controller configuration files, so that similar per-user configuration files can be easily made. Included files would overwrite duplicate elements. Display thresholds for KPIs (Key Performance Indicators) and alerts may be graphically displayed and alternate graphing engines may be used.

IMPLEMENTATION EXAMPLE OF VISIONPORT DASHBOARD

The following description provides a preferred embodiment of a dashboard system constructed in accordance with the present invention. The example is representative of an implemented Dashboard system as designed and built by XOR, Inc. of Boulder, Colo. The dashboard is preferably password protected and can be customized for different executives, departments or partners of an eBusiness. Although the embodiment described herein is presented in the form of a HTML internet-based environment, a Wireless Application Protocol (WAP) version of the Dashboard is also contemplated in order to provide dashboard information to a number of different handheld or wireless devices operating on a variety of platforms.

Figure 3:
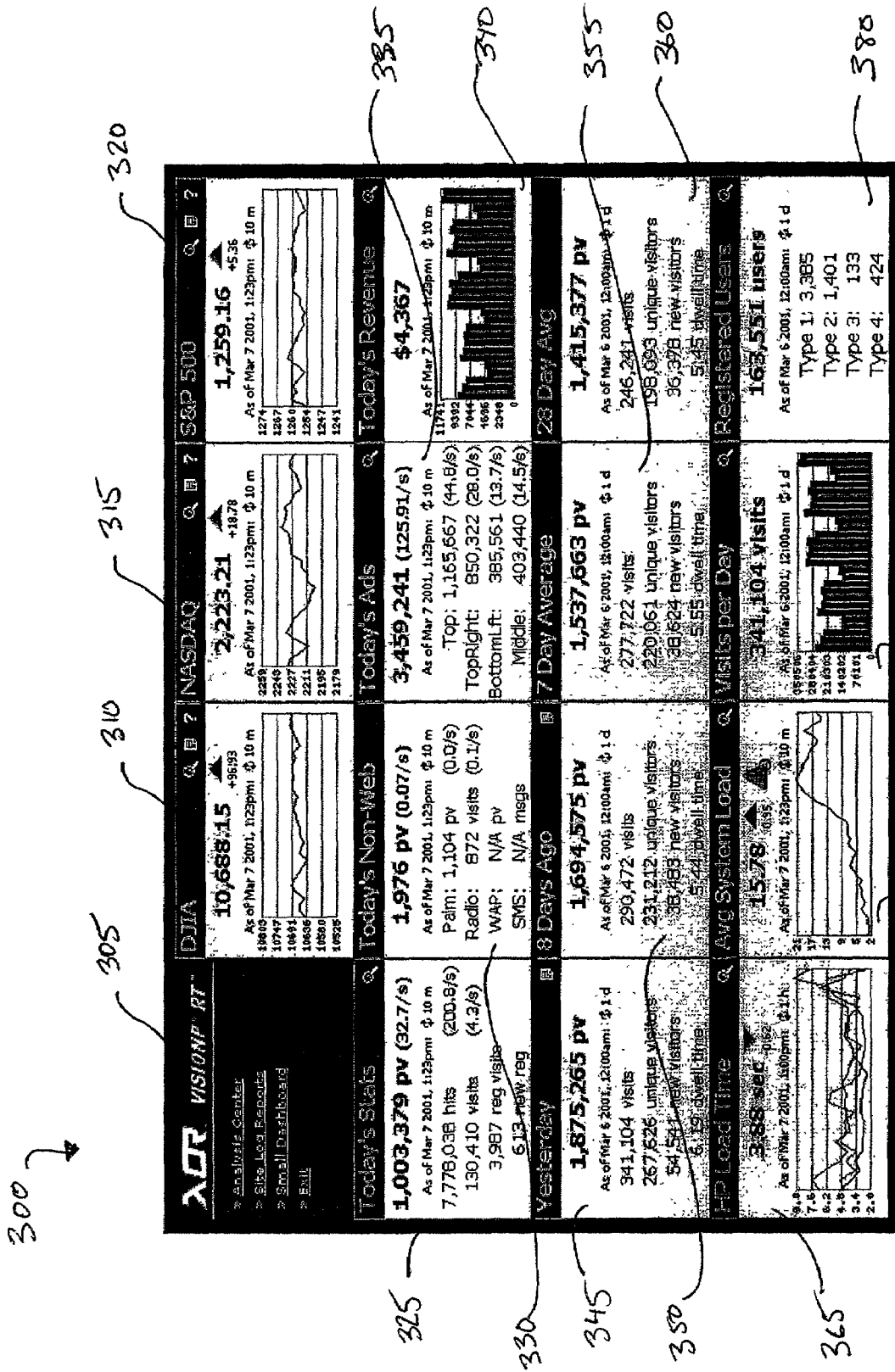
FIG. 3 is a screenshot of a dashboard in accordance with an embodiment of the present invention.

FIG. 3 represents an exemplary main dashboard screen 300 of a dashboard system constructed in accordance with an embodiment of the present invention. Preferably, the dashboard screen 300 is broken down into a grid consisting of up to sixteen indicators although more or less indicators may be utilized. As shown in FIG. 3, the sixteen indicators are labeled (and described) as 305 (control panel), 310 (Dow Jones Stock Market Indicator), 315 (NASDAQ stock market ticker), 320 (S&P 500 stock market ticker), 325 (web site statistics), 330 (non-web site statistics), 335 (advertising statistics), 340 (revenue statistics), 345 (previous day web site statistics-yesterday), 350 (previous day web site statistics-week ago), 355 (average web site statistics), 360 (1 month average web site statistics), 365 (home page load time statistics), 370 (average system load time statistics), 375 (web page visits per day), and 380 (registered users). Preferably, a blank box is displayed whenever there are fewer than 16 indicators in use (e.g. when a 3×3 or 3×4 array of indicators are used). Appendix G, which is hereby incorporated by reference, provides a table that describes of each of the above indicators in further detail. Upon opening in a browser-based environment, the dashboard preferably will resize the browser window to the dimensions necessary to display the indicators.

Figure 4:
FIGS. 4–10 are various details of the dashboard of FIG. 3.

The uppermost left indicator 305 is referred to as a control panel and is preferably present on all dashboard embodiments. FIG. 4 shows the control panel 305 in further detail. The control panel 305 contains a menu of items that includes links to various sub-components of the dashboard system. For example, link 402 accesses the "Analysis Center". The analysis center generates custom reports as defined by a particular user. Preferably, the dashboard system is adapted to link to a third party reporting tool, such as the Brio Reporting engine in order to generate these custom reports (See http://www.brio.com, the details of which are hereby incorporated by reference).

A Link 404 accesses the Site Log Reports which is preferably adapted to link to a third party web log analysis package such as WebTrends. The dashboard may incorporate multiple "Log Reports" links, for example, when a client has more than one web-site, or more than one web-log analysis profile for their site. A Link 406 shrinks the Dashboard to a smaller version that is better adapted for smaller displays and more conducive to put in a corner of a display where it can remain visible while a user engages in other activities. An Exit link 408 closes the dashboard browser window.

Other links can also be incorporated into the control panel 305. For example, various links to other 3$^{rd}$ party applications that a user needs to access regularly or links to other company information may be incorporated into the control panel.

Figure 5:
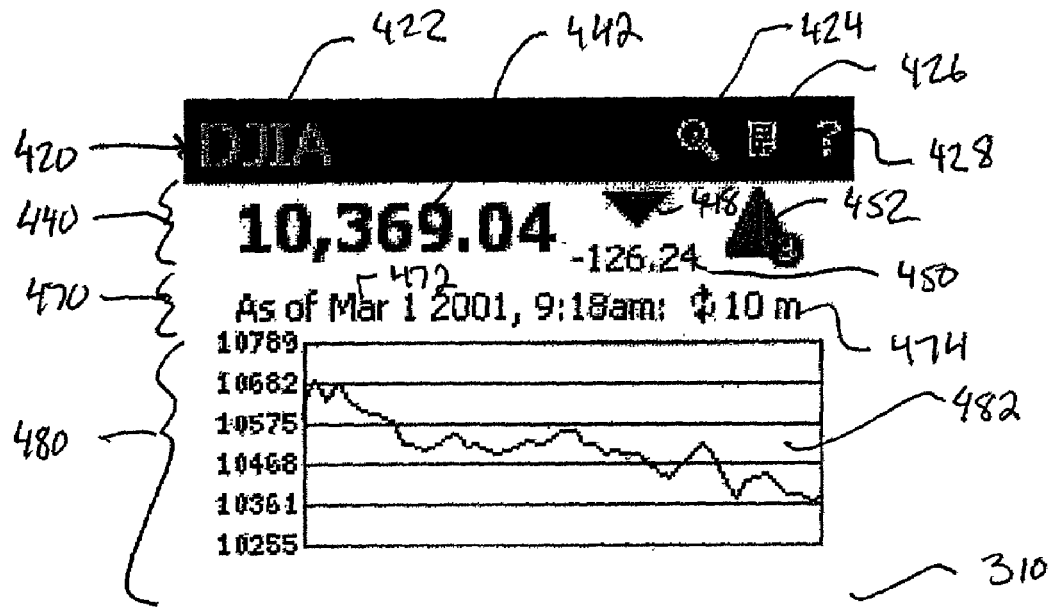
Figure 6:
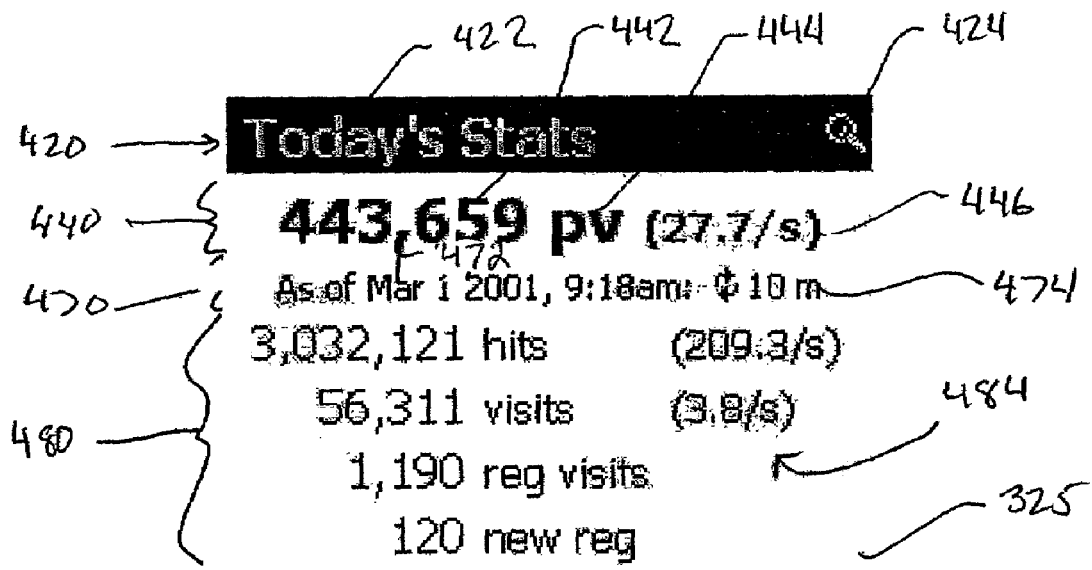
Figure 7:
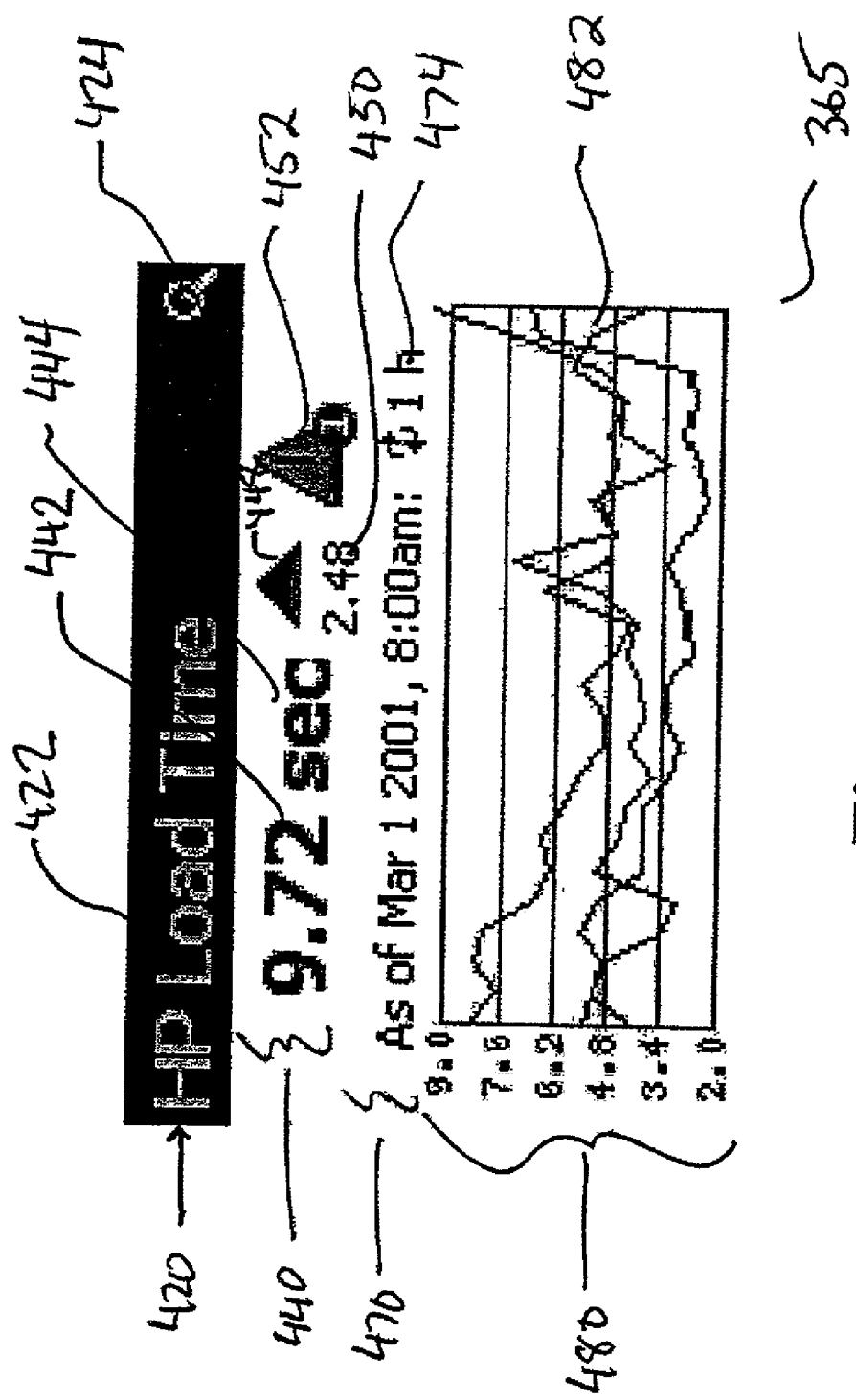

Each of the indicators detail a different aspect of a user's eBusiness. There are several generic types of indicators, which are detailed below. Indicators with other formats, can be created if desired. As an example, FIGS. 5-7 detail the indicators 310, 325, and 365 respectively and illustrate the details of each. A title bar 420 is positioned at the top of each of the indicators and includes an indicator title 422, a detail icon 424, a report icon 426, and a help icon 428. The Indicator Title 422 shows the logical title of the indicator being displayed. Since the displayed title may be truncated or otherwise abbreviated, a user may utilize the help icon 428 to get a full detailed description of what information the indicator is displaying. The detail icon 424 (Magnifying Glass) retrieves a more in-depth display of the information. This may take the form of another grid of indicators e.g., "Today's Stats" indicator, or of a popup window e.g., "HP Load Time" indicator. Details on these popup windows are provided below. The report icon 426 (Paper) links to a more in-depth report of the indicator. In many instances this will link to a specific report in the Analysis Center 402. However, it can also link to other URLs or packages. For example, the DJIA report icon preferably links to the Yahoo Financial site's DJIA details page. The Help Icon 428 (Question-mark) links to a context sensitive help dialog window. The help text provides context on the metric, e.g., its definition, how it's calculated, etc.

A Primary Indicator Number Bar 440 includes a primary indicator value 442, a unit field 444, a rate of change field 446, a directional indicator 448, a recent change field 450, and an alert icon 452. The primary indicator value 442 reflects the most current information the indicator has. The unit field 444 displays the units of the primary indicator value, such as "pv" which stands for "page views" or "sec" which stands for "seconds." The Rate of Change field 446 indicates the rate of change between the current and the last data point retrieved. For example, the "Today's Stats" indicator in FIG. 6 has a rate of change of 27.7 page views per second. This means the client's site was averaging 27.7 page views per second over the last 10 minutes. The directional indicator 448 indicates the current direction of data displayed in the indicator. The Recent change field 450 is the amount that the indicator has changed between the current and last data point. For example, the "HP Load Time" in FIG. 7 has gone up 2.48 seconds in the last hour. The recent change field 450 may sometimes reflects a different time period. For example, with the stock market indicators, the number illustrates the change in the indicator since the start of the trading day. The alert icon 452 indicates if a data item becomes extremely high or low. The alert thresholds are configured on a per-indicator basis. Preferably, alerts can have four levels, from 0 to 3. A level 0 indicator typically does not display an alert icon, but will instead turn the up/down arrow red. Levels 1 through 3 display an icon. If you place your mouse over an alert icon, text will appear and detail the alert.

A Data Refresh Information bar 470 includes a date field 472 and a refresh interval field 474. The date field 472 indicates the date and time that the currently displayed information represents. The refresh interval field 474 describes how frequently the information in this indicator changes. Preferably, the refresh interval comes in three forms: minutes (e.g. 10 m), hours (e.g. 6 h), or days (e.g. 1 d). This is not, however, the amount of time that passes between refreshing the information on the screen. For example, a refresh interval of "1 d" indicates that the information is updated once per day. However, the dashboard system 100 may check for new information every hour so the user receives refreshed information soon after it becomes available.

An Additional Information bar 480 includes either a Graph field 482 or a table data field 484. The graph field 482 graphs the history of the current indicator or the history of information relevant to the current indicator. Graphs may be displayed as lines, bars, or pie charts. The table data field 484 displays either a breakdown of items that make up the main indicator number or additional, less critical statistics that relate to the indicator. For example, a "Registered Users" indicator may detail the different types of users and the number of each.

Figure 8:
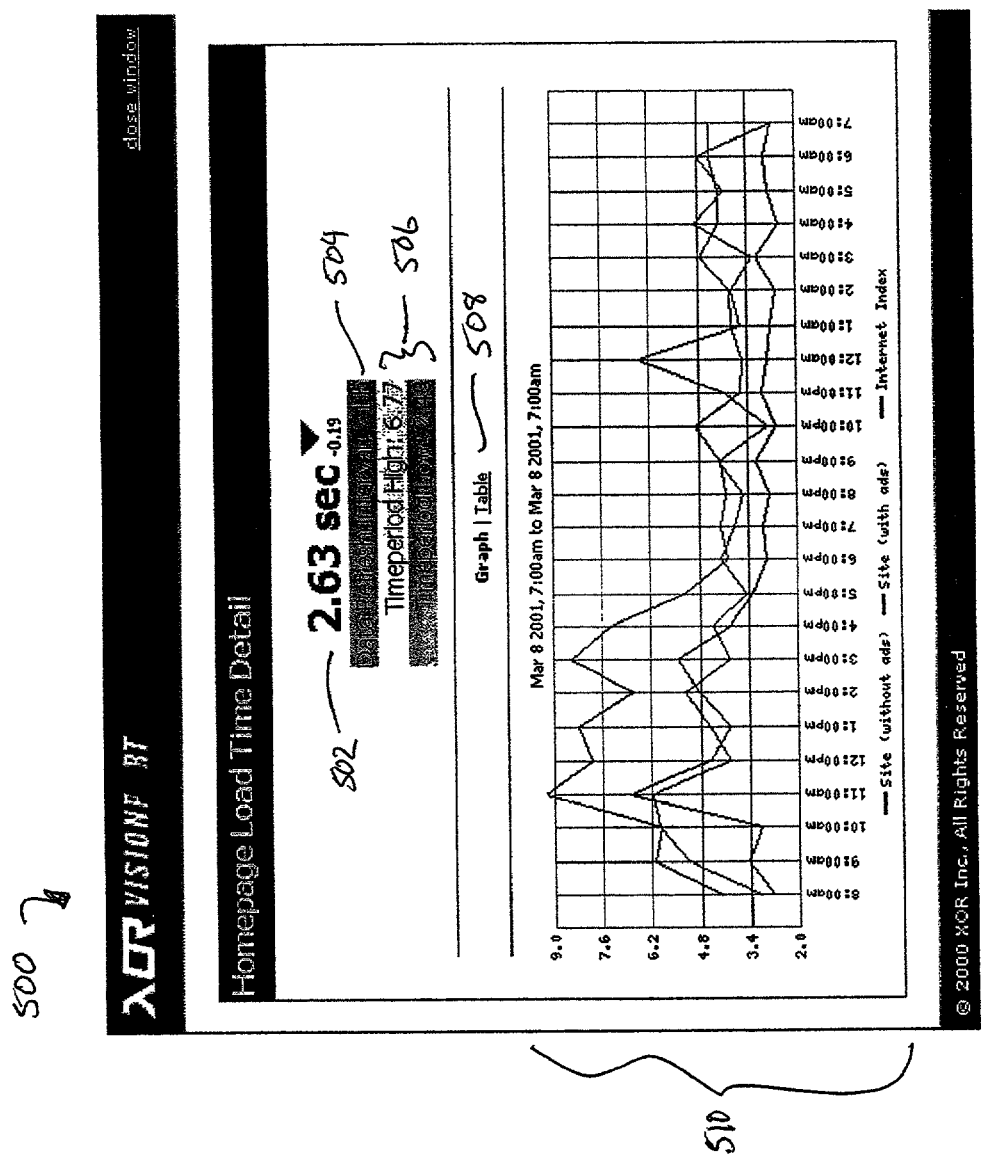
Figure 9:
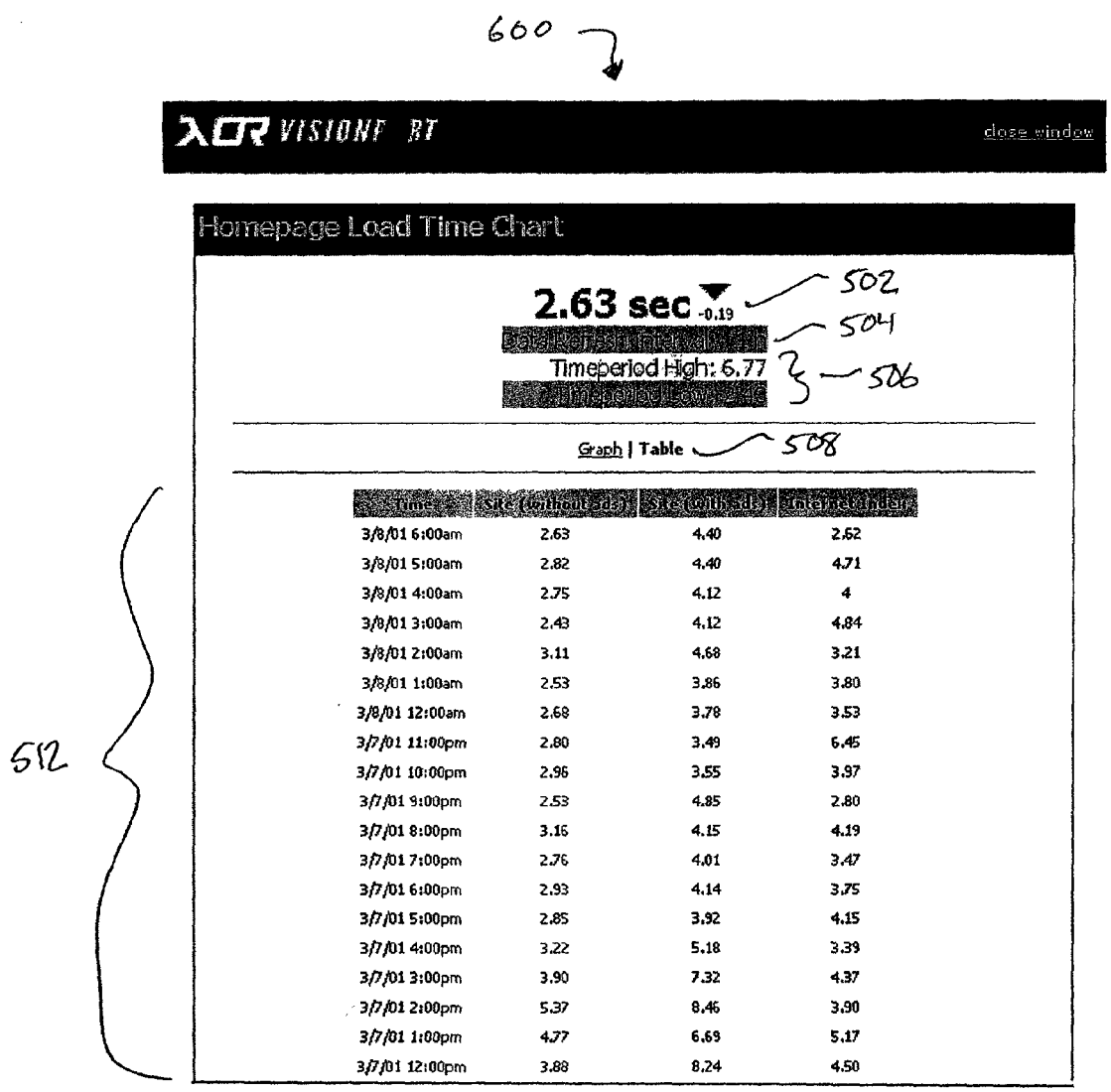
Figure 10:
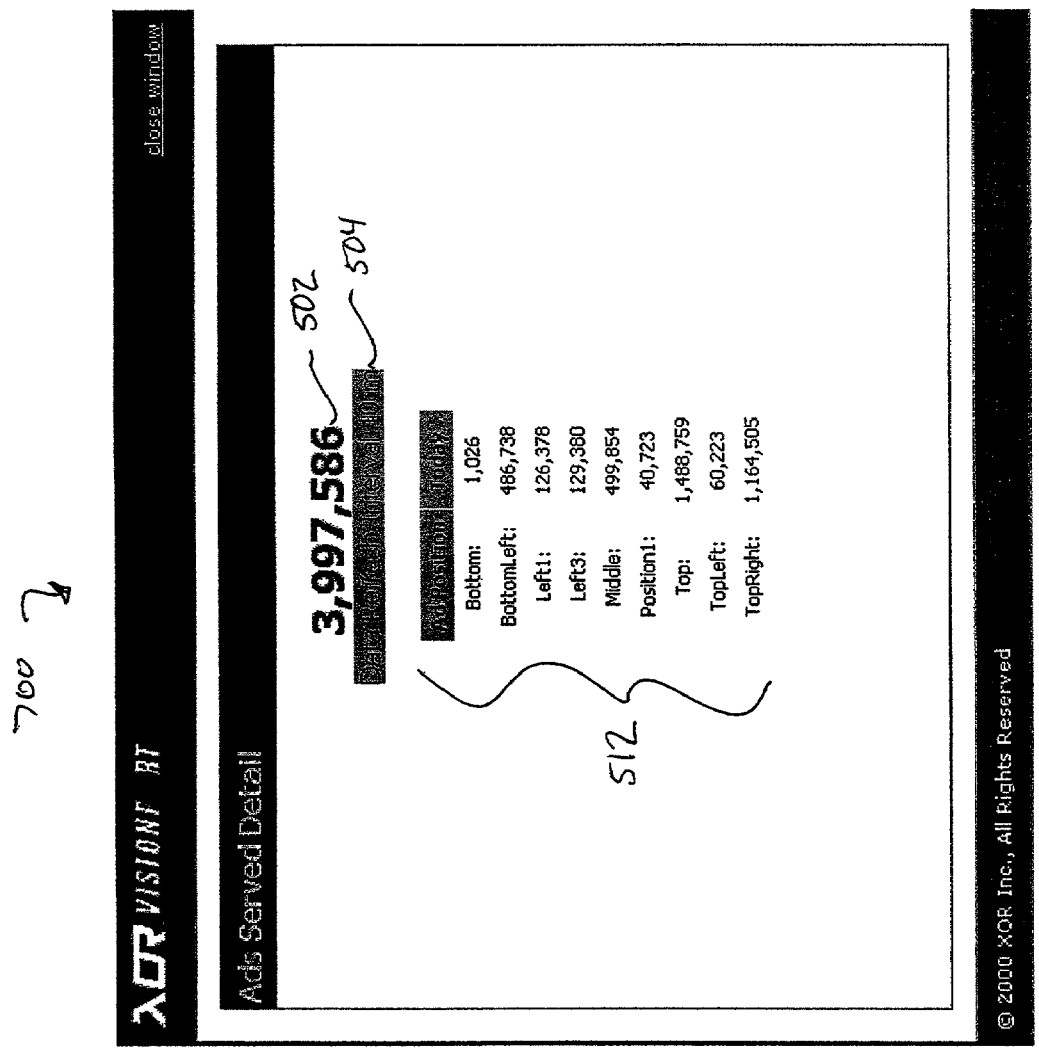

By selecting the detail icon 424 a detail pop-up window will be displayed. FIGS. 8-10 show representative examples of detail pop-up windows 500, 600, and 700 respectively. Each of the detail popup windows displays a more in-depth view of the data provided by the associated indicator. The detail popup windows may come in a variety of formats including, for example, graphs (FIG. 8) and tables (FIGS. 9 and 10). FIGS. 8 and 9 are an example of a line graph and its associated table. FIG. 10 is an example of a detailed table that does not include an associated graph.

Referring to FIG. 8, the detail pop-up window 500 includes a primary indicator number 502, a data refresh field 504, a high/low field 506, a graph/table toggle field 508, and a graph field 510. The primary indicator number 502 has the same elements that its associated summary Dashboard indicator does, including units, rate of change, up/down arrow, number under arrow, and alert icon. The Data Refresh field 504 also displays the same information as on its associated summary Dashboard indicator. The High/Low field 506 displays the high and low of the primary indicator number during the time-period in the graph. The Graph/Table Toggle field 508 allows a user to toggle between the graph and table versions of the same data. This field will not appear if only table data is available. The Graph Data field 510 displays the history of the indicator number in either line, bar or pie chart format. Preferably, multiple items can be graphed. For example, on the "HP Load Time" graph in FIG. 8, load times for the home page both with and without ads and a standard "Internet Index" are graphed. Data for a point on the graph will be displayed on mouse-over. FIGS. 9 and 10 include a Table Data field 512 that displays the history of the indicator number and possibly the history of related statistics as well in a table form rather than a graph form.

In addition to the ability to retrieve proprietary information from a legacy system or another internal corporate database, a dashboard system constructed in accordance with an embodiment of the present invention is preferably adapted to interact with and retrieve data and other business metrics from third party software and web-based applications. For example, the VisionPort Dashboard has the ability to extract and display information generated from the third party application CommerceTrends. In the VisionPort dashboard system, nearly every piece of information that is visible in an original CommerceTrends report can be displayed as a VisionPort Dashboard Indicator. For example, the following table details some of the standard CommerceTrends reports that may be extracted and displayed by the VisionPort dashboard system:

| Activity | Summary for Report Period |
| | Month Visits/Hits |
| | Week Visits/Hits |
| | Day of the Week Visits/Hits |
| | Hour of the Day Visits/Hits |
| | Number of Pages Viewed per Visitor |
| | Length of Visit by Visits/Views |
| | By Kbytes Transferred Over Time of Day |
| Advertising | Views and Clicks (summary) |
| | Advertising Views (visits/views over time) |
| | Advertising Clicks (visits/views over time) |
| | Browsers and Systems |
| | Top Browsers |
| | Microsoft Explorer Browsers |
| | Netscape Browsers |
| | Top Platforms |
| | Errors |
| | Technical Statistics |
| | Dynamic Pages & Form Errors |
| | Client Errors |
| | Page Not Found Errors |
| | Server Errors |
| Files | Top Entry Files |
| | Least Requested Entry Files |
| | Hits Over Time |
| | Most Downloaded Files |
| | Most Uploaded Files |
| | Top Directories |
| | Most Downloaded File Types |

-continued

| Hits Over Time | |
| Marketing Campaigns Summary | Revenue forecast by Marketing Campaign |
| | Revenue forecast by Marketing Campaign and Product |
| | ROI by Marketing Campaign |
| | ROI Percent by Marketing Campaign |
| Pages | Top Entry Pages totals and over time |
| | Least requested Entry Pages totals and over time |
| | Top Exit Pages totals and over time |
| | Top Content Groups |
| | Single Access Pages |
| | Dynamic Pages and Forms |
| | Views Over Time |
| Parameter Analysis by Visits/Hits | |
| Paths | Top Paths Through Site |
| | Top Destination Paths Through Site |
| Product Summary | Revenue Forecast by Product and Visitor Type (qualified/non-qualified) |
| | Revenue Forecast by Product and Referrer |
| Referrers | Top Referring Sites |
| | Top Referring URLs |
| | Top Search Engines |
| | Top Search Phrases |
| | Top Search Keywords |
| Server Cluster Load Balance | By Kbytes Transferred |
| | By Hits |
| Visitors | New vs. Returning Visitors (Totals and Over Time) |
| | Top Authenticated Visitors (Visits/Hits with Over Time) |
| | Top Visitors (Visits/Hits with over time) |
| | Visits Over Time |
| | Number of Visits |

Figure 12:

FIGS. 11 and 12 represent an example of a dashboard setup in accordance with an embodiment of the present invention where a "global" association has one dashboard configuration (FIG. 11) and each of any number of association franchises has a second dashboard configuration (FIG. 12). In the association dashboard, figures are compiled for the association as a whole rather than for any one particular franchise, where the franchise dashboard is particularized for one particular outlet, store, or location. Information that is not of particular importance to a franchise is not displayed on the franchise dashboard. The same is true for the association dashboard. Individual dashboards may be set up for each individual franchise in an association.

Although the present invention has been described and illustrated in the above description and drawings, it is understood that this description is by example only and that numerous changes and modifications can be made by those skilled in the art without departing from the true spirit and scope of the invention. The invention, therefore, is not to be restricted, except by the following claims and their equivalents.

What is claimed is:

1. A system for monitoring business performance indicators in a networked environment, comprising:
   a data source having a predefined format;
   an agent communicatively coupled to the data source, wherein the agent is configured according to the data source format and wherein the agent is operative to gather data from the data source and translate the data into a modified data;
   a reaper communicatively coupled to the agent and configured to retrieve the modified data from the agent;

a data repository communicatively coupled to the reaper and configured to store the modified data;

an alert detector communicatively coupled to the data repository and configured to compare the modified data with a first configuration parameter; and a dashboard controller communicatively coupled to the data repository and configured to display the modified data in a format defined by a second configuration parameter;

wherein an agent polling configuration file is communicatively coupled to the reaper and configured to a store data polling schedule and provide schedule to the reaper.

2. The system of claim 1, further comprising an alert configuration file communicatively coupled to the alert detector and adapted to store the first configuration parameter.

3. The system of claim 1, further comprising a visual configuration file communicatively coupled to the dashboard controller and adapted to store the second configuration parameter.

4. The system of claim 1, wherein the dashboard controller comprises an interface for translating the modified data into a user-readable format.

5. The system of claim 4, wherein the dashboard controller further comprises a memory cache.

6. The system of claim 1, wherein the dashboard controller comprises a plurality of interfaces for translating the modified data into a plurality of user-readable formats.

7. The system of claim 1, further comprising a display device communicatively coupled to the dashboard controller and adapted to present the modified date in a user-readable format.

8. The system of claim 7, wherein the user-readable format is Hyper-Text Markup Language.

9. The system of claim 7, wherein the user-readable format is Wireless Markup Language.

10. The system of claim 7, wherein the display device is a monitor.

11. The system of claim 7, wherein the display device is a cellular phone.

12. The system of claim 7, wherein the display device is a pager.

13. The system of claim 1, further comprising a VoiceXML interface communicatively coupled with the dashboard controller.

14. The system of claim 1, wherein the data source is a proprietary data source.

15. The system of claim 1, wherein the data source is a legacy data source.

16. The system of claim 1, wherein the data source is a third-party application.

17. The system of claim 1, wherein the data source resides on a local area network.

18. The system of claim 1, wherein the data source resides on a wide area network.

19. The system of claim 1, wherein the data source is accessible through the Internet.

20. The system of claim 1, wherein the reaper is in two way communication with the agent.

21. The system of claim 1, wherein the alert detector is adapted to send a notification based on the comparison between the modified data and the first configuration parameter.

22. The system of claim 21, wherein the notification is sent via an email message.

23. The system of claim 22, wherein the notification is sent via a pager message.

24. The system of claim 21, wherein the notification is sent via an SNMP trap.

25. The system of claim 21, wherein the notification is sent via an internet browser alert.

26. The system of claim 1, wherein the networked environment is an electronic commerce system.

27. A system for monitoring business performance indicators in a networked environment, comprising:

a data source having a predefined format;

an agent communicatively coupled to the data source, wherein the agent is configured according to the data source format and wherein the agent is operative to gather data from the data source and translate the data into a modified data;

a reaper communicatively coupled to the agent and configured to retrieve the modified data from the agent;

a repository manager communicatively coupled to the reaper;

a data repository communicatively coupled to the repository manger;

an alert detector communicatively coupled to the repository manager; and a dashboard controller communicatively coupled to the repository manager;

wherein an agent polling configuration file is communicatively coupled to the reaper and configured to store a data polling schedule and provide the data polling schedule to the reaper.

28. The system of claim 27, wherein the repository manager includes a cache, and wherein the repository manager is configured to manage the storage of the modified data within the data repository.

29. The system of claim 27, further comprising an alert detector communicatively coupled to the repository manager and configured to compare the modified data with a first configuration parameter.

30. The system of claim 27, wherein the repository manager is in two way communication with the reaper.

31. The system of claim 27, wherein the data repository is in two way communication with the repository manager.

32. The system of claim 27, wherein the alert detector is in two way communication with the repository manager.

33. The system of claim 27, wherein the dashboard controller is in two way communication with the repository manager.

34. A system for monitoring a plurality of business metrics in a networked environment, comprising:

a plurality of data sources, wherein each of the plurality of data sources has a predefined format;

a plurality of agents, wherein each of the plurality of agents is communicatively coupled to one of the plurality of data sources, wherein each of the plurality of agents is configured according to the predefined format of the corresponding data source, and wherein each of the plurality of agents is operative to gather data from the corresponding data source and translate the data into a modified format thereby creating modified data; and a reaper communicatively coupled to each of the plurality of agents and configured to retrieve the modified data from each of the plurality of agents;

wherein the agents polling configuration file is communicatively coupled to the reaper and configured to store a data polling schedule and provide the data polling schedule to the reaper.

35. The system of claim 34, further comprising a dashboard controller communicatively coupled to the reaper and configured to display the modified data in a format defined by a configuration parameter.

36. A method far monitoring a business metric in a networked environment, comprising:
coupling to a data source having a known format, wherein the data source includes data that represents the business metric;
configuring an agent according to the data source format;
gathering the data from the data source via the agent;
translating the data into a modified format;
storing the modified data in a data repository;
a reaper communicatively coupled to the agent and configured to retrieve the modified data from the agent;
comparing the modified data with an alert parameter range;
displaying the modified data in a format defined by a second configuration parameter; determining whether the modified data falls within the alert parameter range;
producing an alert if the modified data falls within the alert parameter range; and
wherein the agent polling configuration file is communicatively coupled to the reaper and configured to store a data polling schedule and provide the data polling schedule to the reaper.

37. The method of claim 36, wherein the data source is a third party application accessible through a URL address.

38. The method of claim 36, further comprising interfacing with a display device, wherein displaying the modified data in a format defined by a second configuration parameter is implemented on the display device.

39. The method of claim 38, wherein the display device is a cell phone.

40. The method of claim 38, wherein the display device is a pager.

41. The method of claim 38, wherein the display device is a personal computer monitor.

42. A computer-readable storage medium having computer-executable instructions for performing a method of:
coupling to a data source having a known format, wherein the data source includes data that represents the business metric;
configuring an agent according to the data source format;
gathering the data from the data source via the agent;
translating the data into a modified format;
storing the modified data in a data repository;
comparing the modified data with an alert parameter range;
displaying the modified data in a format defined by a second configuration parameter;
a reaper communicatively coupled to the agent and configured to retrieve the modified data from the agent;
determining whether the modified data falls within the alert parameter range;
producing an alert if the modified data falls within the alert parameter range; and
wherein the agent polling configuration file is communicatively coupled to the reaper and configured to store a data polling schedule and provide the data polling schedule to the reaper.

43. A method for monitoring a business metric in a networked environment, comprising:
means for coupling to a data source having a known format, wherein the data source includes data that represents the business metric;
means for configuring an agent according to the data source format;
means for a reaper gathering data from the data source via the agent;
means for translating the data into a fist modified format;
means for storing the modified data in a data repository;
means for comparing the modified data with an alert parameter range;
means for displaying the modified data in a format defined by a second configuration parameter;
means for determining whether the modified data falls within the alert parameter range; and
means for producing an alert if the modified data falls within the alert parameter range; and
means for polling configuration file communicatively coupled to the reaper and configured to store a data polling schedule and provide the data polling schedule to the reaper.

44. A system for monitoring a business metric in a networked environment, comprising:
a processor;
a data storage device;
an instruction set residing on the data storage device, wherein the instruction set is configured to perform a method, the method comprising
coupling to a data source having a known format, wherein the data source includes data that represents the business metric;
configuring an agent according to the data source format;
gathering the data from the data source via the agent;
translating the data into a modified format;
storing the modified data in a data repository;
comparing the modified data with an alert parameter range;
a reaper communicatively coupled to the agent and configured to retrieve the modified data from the agent;
displaying the modified data in a format defined by a second configuration parameter;
determining whether the modified data falls within the alert parameter range;
producing an alert if the modified data falls within the alert parameter range; and
wherein the agent polling configuration file is communicatively coupled to the reaper and configured to store a data polling schedule and provide the data polling schedule to the reaper.

45. A system for monitoring business performance indicators in a networked environment, comprising:
a data source having a predefined format;
a reaper communicatively coupled to the data source, wherein the reaper is configured according to the data source format and wherein the reaper is operative to gather data from the data source and translate the data into a first modified format thereby creating modified data;
a controller communicatively coupled to the collector and configured to retrieve the modified data from the collector;
a storage device communicatively coupled to the controller and configured to store the modified data;
an alert detector communicatively coupled to the storage device and configured to compare the modified data with a first configuration parameter; and
a display interface communicatively coupled to the storage device and configured to display the modified data in a visual dashboard format defined by a second configuration parameter; and wherein the agent polling configuration file is communicatively coupled to the reaper and configured to store a data polling schedule and provide the data polling schedule to the reaper.

46. A system for monitoring business performance indicators in a networked environment, comprising:

a reaper adapted to communicatively coupled to a data source having a predetermined format, wherein the reaper is configured according to the data source format and wherein the reaper is operative to gather data from the data source and translate the data into a modified data;

a data manager communicatively coupled to the collector and configured to manage the input and output of the modified data between the reaper and a data storage device, wherein the data manager is adapted to communicatively couple with an alert device;

a display interface communicatively coupled to the data manager and configured to display the modified data in a format defined by a second configuration parameter; and wherein the data manager polling configuration file is communicatively coupled to the reaper and configured to store a data polling schedule and provide the data polling schedule to the reaper.

* * * * *

UNITED STATES PATENT AND TRADEMARK OFFICE
CERTIFICATE OF CORRECTION

PATENT NO. : 7,188,169 B2 Page 1 of 1
APPLICATION NO. : 09/877414
DATED : March 6, 2007
INVENTOR(S) : Buus et al.

It is certified that error appears in the above-identified patent and that said Letters Patent is hereby corrected as shown below:

Title Page, Item (65) Prior Publication Data, replace "US 2003/0115315 A1   Jun. 19, 2003"

with --US 2003/0110249 A1   Jun. 12, 2003--

Signed and Sealed this

Fourth Day of August, 2009

JOHN DOLL
*Acting Director of the United States Patent and Trademark Office*